(12) United States Patent
Le et al.

(10) Patent No.: US 10,994,530 B1
(45) Date of Patent: May 4, 2021

(54) PRINTING DEVICE TEMPERATURE MANAGEMENT

(71) Applicant: Hewlett-Packard Development Company, L.P., Spring, TX (US)

(72) Inventors: Huy Le, Vancouver, WA (US); Bradley D Chung, Corvallis, OR (US); Thomas P Abadilla, Corvallis, OR (US); Jeffrey K Pew, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 187 days.

(21) Appl. No.: 16/478,420

(22) PCT Filed: Jan. 27, 2017

(86) PCT No.: PCT/US2017/015432
§ 371 (c)(1),
(2) Date: Jul. 16, 2019

(87) PCT Pub. No.: WO2018/140044
PCT Pub. Date: Aug. 2, 2018

(51) Int. Cl.
*B41J 2/045* (2006.01)
*G05D 23/19* (2006.01)

(52) U.S. Cl.
CPC ....... *B41J 2/04515* (2013.01); *B41J 2/04528* (2013.01); *B41J 2/04553* (2013.01); *G05D 23/1917* (2013.01)

(58) Field of Classification Search
CPC .......... B41J 2/04515; B41J 2/04528; B41J 2/04553; G05D 23/1917
See application file for complete search history.

(56) References Cited

U.S. PATENT DOCUMENTS

| 5,500,667 | A | 3/1996 | Schwiebert et al. |
| 6,513,895 | B2 | 2/2003 | Bauer et al. |
| 6,655,772 | B2 | 12/2003 | Danzuka et al. |
| 7,057,141 | B1 | 6/2006 | Moy |
| 8,885,209 | B2 | 11/2014 | Yamazaki |
| 10,429,780 | B1 * | 10/2019 | Hasegawa .......... G03G 15/2039 |
| 2006/0104652 | A1 * | 5/2006 | Nishiyama .......... G03G 15/2046 399/68 |

(Continued)

FOREIGN PATENT DOCUMENTS

| EP | 0300634 B1 | 4/1992 |
| EP | 2347908 A1 | 7/2011 |
| WO | WO-2015/113623 | 8/2015 |

OTHER PUBLICATIONS

Webpage ~ Troubleshooting Guide to 16 Common 3D Printing Problems, https://all3dp.com/ ~ Nov. 30, 2016 ~ 28 pages.

*Primary Examiner* — Yaovi M Ameh
(74) *Attorney, Agent, or Firm* — Mannava & Kang

(57) ABSTRACT

In some examples, printing device temperature management may include ascertaining a print speed associated with a print job, and comparing the print speed to a print speed threshold. Printing device temperature management may further include actuating a power supply associated with a print bar at a start position of physical medium to be utilized for printing for the print job, or at or beyond a specified location along a path associated with traversal of the physical medium from the start position to a print zone to reduce an operational temperature associated with the print bar.

15 Claims, 6 Drawing Sheets

500

ASCERTAIN A PRINT SPEED ASSOCIATED WITH A PRINT JOB
502

↓

ACTUATE, IN RESPONSE TO A DETERMINATION THAT THE PRINT SPEED IS GREATER THAN OR EQUAL TO A SPECIFIED PRINT SPEED THRESHOLD, A PRINT BAR HEATING POWER SUPPLY AND A PRINT BAR CONTROL POWER SUPPLY TO RESPECTIVELY HEAT AND CONTROL OPERATION OF A PRINT BAR
504

↓

DETERMINING, IN RESPONSE TO A DETERMINATION THAT THE PRINT SPEED IS LESS THAN THE SPECIFIED PRINT SPEED THRESHOLD, A DISTANCE OF PHYSICAL MEDIUM FROM A PRINT ZONE, AND ACTUATING, IN RESPONSE TO A DETERMINATION THAT THE DISTANCE OF THE PHYSICAL MEDIUM FROM THE PRINT ZONE IS EQUAL TO A SPECIFIED DISTANCE WHICH IS LESS THAN A TOTAL DISTANCE TRAVERSED BY THE PHYSICAL MEDIUM FROM A START POSITION TO THE PRINT ZONE, AT OR BEYOND THE SPECIFIED DISTANCE, THE PRINT BAR HEATING POWER SUPPLY AND THE PRINT BAR CONTROL POWER SUPPLY TO REDUCE AN OPERATIONAL TEMPERATURE ASSOCIATED WITH THE PRINT BAR
506

(56) References Cited

U.S. PATENT DOCUMENTS

2006/0203027 A1    9/2006  Espasa et al.
2013/0093813 A1    4/2013  Davis et al.
2014/0320563 A1*  10/2014  Gracia Verdugo ..... B41J 2/0458
                                                        347/17

* cited by examiner

500

ASCERTAIN A PRINT SPEED ASSOCIATED WITH A PRINT JOB
502

ACTUATE, IN RESPONSE TO A DETERMINATION THAT THE PRINT SPEED IS GREATER THAN OR EQUAL TO A SPECIFIED PRINT SPEED THRESHOLD, A PRINT BAR HEATING POWER SUPPLY AND A PRINT BAR CONTROL POWER SUPPLY TO RESPECTIVELY HEAT AND CONTROL OPERATION OF A PRINT BAR
504

DETERMINING, IN RESPONSE TO A DETERMINATION THAT THE PRINT SPEED IS LESS THAN THE SPECIFIED PRINT SPEED THRESHOLD, A DISTANCE OF PHYSICAL MEDIUM FROM A PRINT ZONE, AND ACTUATING, IN RESPONSE TO A DETERMINATION THAT THE DISTANCE OF THE PHYSICAL MEDIUM FROM THE PRINT ZONE IS EQUAL TO A SPECIFIED DISTANCE WHICH IS LESS THAN A TOTAL DISTANCE TRAVERSED BY THE PHYSICAL MEDIUM FROM A START POSITION TO THE PRINT ZONE, AT OR BEYOND THE SPECIFIED DISTANCE, THE PRINT BAR HEATING POWER SUPPLY AND THE PRINT BAR CONTROL POWER SUPPLY TO REDUCE AN OPERATIONAL TEMPERATURE ASSOCIATED WITH THE PRINT BAR
506

FIG. 5

PRINTING DEVICE TEMPERATURE MANAGEMENT

BACKGROUND

A printing device, such as a printer, multifunction printer, and/or other such devices may be described as a peripheral which is used to make a persistent human readable representation of graphics or text on physical media such as paper. A printing device may include various components to move the physical media from a first location, such as an input tray, to a second location, such as an output tray.

BRIEF DESCRIPTION OF DRAWINGS

Features of the present disclosure are illustrated by way of example and not limited in the following figure(s), in which like numerals indicate like elements, in which:

FIG. 5 illustrates a flowchart of a method for printing device temperature management, according to an example of the present disclosure.

DETAILED DESCRIPTION

Figure 1:
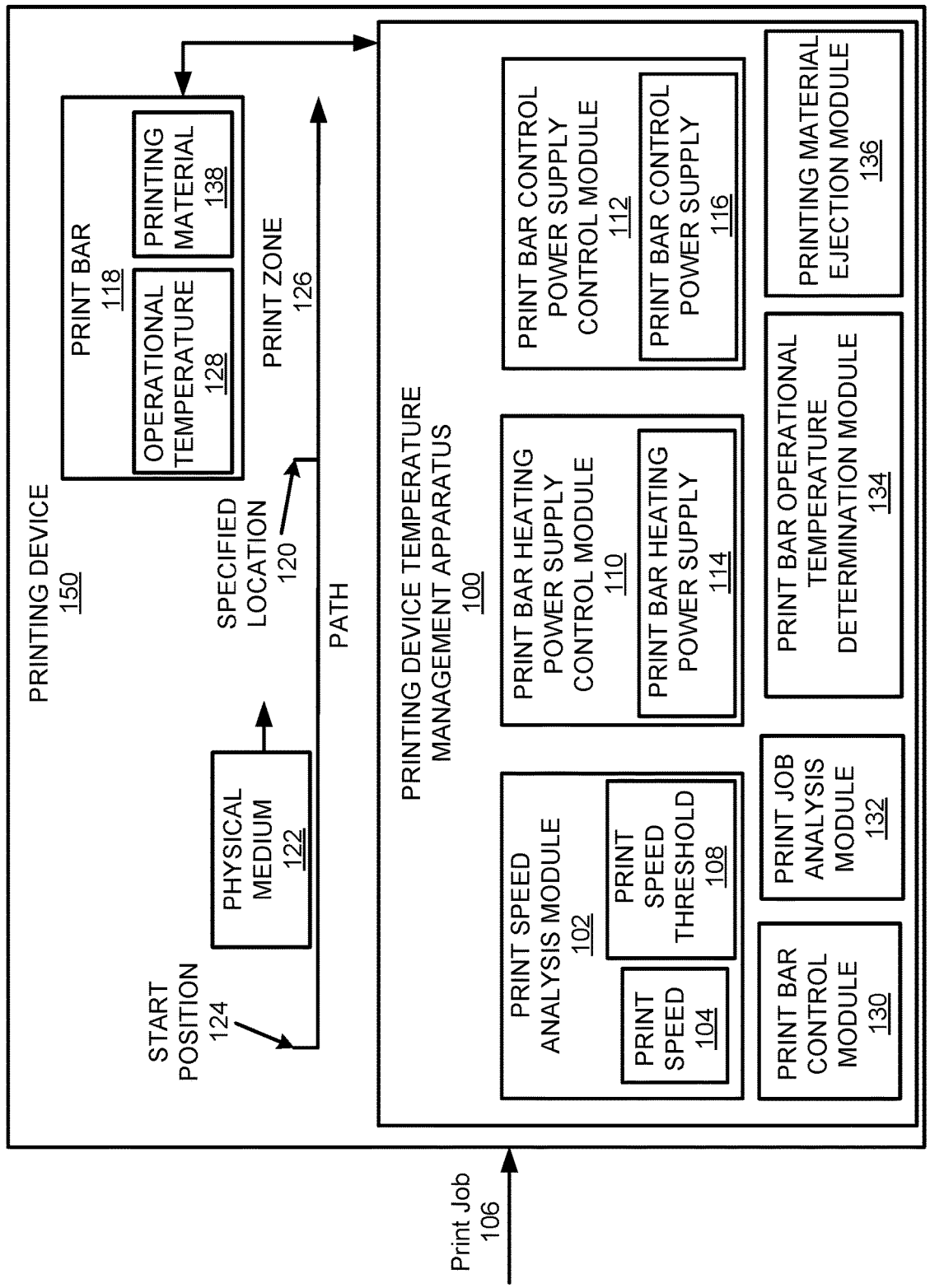
FIG. 1 illustrates a layout of a printing device temperature management apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A printing device temperature management apparatus, a method for printing device temperature management, and a non-transitory computer readable medium having stored thereon machine readable instructions to provide printing device temperature management are disclosed herein. The apparatus, method, and non-transitory computer readable medium disclosed herein provide printing device temperature management, for example, with respect to management of an operational temperature associated with a print bar (and/or other components) of a printing device.

In printing devices such as page wide printers that may include hundreds or thousands of nozzles, idling between print jobs may result in blockage of nozzles due to cooling and heating of printing material. For example, during idle periods of a printing device, the printing material may cool to absorb air, and during printing, the printing material may warm and release the absorbed air. The warm printing material may bubble and thus block nozzles of the printing device.

For example, when a printing device such as a page wide printer has been idle at an ambient temperature of 15-17° C. or colder for a period of hours (e.g., 10 hours), hundreds of black missing nozzles may occur as printing material cools and absorbs more air. When the printing device begins to print again, local black printing material close to nozzles warms and releases air. This is because saturated warm printing material holds less air. The printing material may continue to absorb heat from printing and logic control power (e.g., print bar control power supply or $V_{dd}$ as disclosed herein), causing air bubbles to grow in size and eventually block nozzles from ejecting the printing material onto physical media.

The apparatus, method, and non-transitory computer readable medium disclosed herein overcome the aforementioned technical challenges by providing for printing device temperature management by ascertaining a print speed associated with a print job, and determining whether the print speed is greater than or equal to a specified print speed threshold (e.g., greater than or equal to 8 inches per second (ips)). In response to a determination that the print speed is greater than or equal to the specified print speed threshold, a print bar heating power supply (e.g., $V_{pp}$) and a print bar control power supply (e.g., $V_{dd}$) may be actuated to respectively heat and control operation of a print bar. Alternatively, in response to a determination that the print speed is less than the specified print speed threshold (e.g., less than 8 ips), the print bar heating power supply and the print bar control power supply may be actuated at or beyond a specified location (e.g., 0.5 inches from a print zone) along a path associated with traversal of a physical medium from a start position (e.g., an input tray) to the print zone (e.g., a zone of the printing device where nozzles eject printing material onto physical media). In this manner, the print bar heating power supply and the print bar control power supply are not unnecessarily actuated (and operational) upon receiving the print job, which provides for a reduction in the operational temperature associated with the print bar (and/or other components of a printing device). Further, the print bar heating power supply and the print bar control power supply are de-actuated after printing of a last physical medium, instead of at a later stage.

According to an example, for the apparatus, method, and non-transitory computer readable medium disclosed herein, energy may be delivered to a print bar so as to turn the energy into heat to warm printing material, and release heat faster to cool the printing material. For the apparatus, method, and non-transitory computer readable medium disclosed herein, the energy reduction may be obtained by eliminating unnecessary power supply to the print bar at the end of a print job and/or at the beginning of a print job (e.g., turning off print bar warming ($V_{pp}$) and $V_{dd}$ after a last physical medium of a print job exits a print zone, turning on print bar warming at a later stage when a physical medium is closer to the print zone for a relatively slow speed print job). In order to prevent the printing material from becoming too hot and to cool the printing material faster, a gap spit may be changed to spit at a relatively lower temperature compared to a temperature of the print bar during ejection of printing material (e.g., 55° C. instead of 60° C.). Further, cold end job spit servicing may also be added at the last physical medium of a print job.

For the apparatus, method, and non-transitory computer readable medium disclosed herein, modules, as described herein, may be any combination of hardware and programming to implement the functionalities of the respective modules. In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates a layout of a printing device temperature management apparatus (hereinafter also referred to as "apparatus 100"), according to an example of the present disclosure.

In some examples, the apparatus 100 may include or be provided as a component of a print server for processing print data before the processed print data is transmitted to a printing apparatus, such as an inkjet printer, or any type of printing device. Alternatively, as illustrated in FIG. 1, the apparatus 100 may be a component of a printing device 150.

Referring to FIG. 1, the apparatus 100 may include print speed analysis module 102 to ascertain a print speed 104 associated with a print job 106.

In response to a determination by the print speed analysis module 102 that the print speed 104 is greater than or equal to a specified print speed threshold 108, a print bar heating power supply control module 110 and a print bar control power supply control module 112 may respectively actuate a print bar heating power supply 114 and a print bar control power supply 116 to respectively heat and control operation of a print bar 118. In this regard, the print bar heating power supply 114 and the print bar control power supply 116 being actuated upon receipt of the print job 106 may ensure that throughput of a relatively high speed print job 106 is not negatively affected due to delay in warming of the print bar 118.

Alternatively, in response to a determination that the print speed 104 is less than the specified print speed threshold 108, the print bar heating power supply control module 110 and the print bar control power supply control module 112 may respectively actuate, at or beyond a specified location 120 along a path associated with traversal of a physical medium 122 from a start position 124 to a print zone 126, the print bar heating power supply 114 and the print bar control power supply 116 to reduce an operational temperature 128 associated with the print bar 118. In this regard, the operational temperature 128 associated with the print bar 118 may represent the operational temperature 128 of components such as a print head, a pen, nozzles, etc., associated with the print bar 118. Further, with the print bar heating power supply 114 and the print bar control power supply 116 being actuated at or beyond the specified location 120, this ensures that throughput of the relatively low speed print job 106 is not negatively affected.

According to an example, the physical medium 122 may be utilized for printing for the print job 106. For example, the physical medium 122 may include paper.

According to an example, the specified location 120 may be located along the path at a specified distance (e.g., 0.5 inches) from the print zone 126, where the specified distance is less than a total distance traversed by the physical medium 122 from the start position 124 to the print zone 126. For example, assuming that the total distance traversed by the physical medium 122 from the start position 124 to the print zone 126 is approximately eight (8) inches, the specified location 120 may be located along the path at a specified distance (e.g., 0.5 inches) that is less than the total distance (e.g., 8 inches) traversed by the physical medium 122 from the start position 124 to the print zone 126. The specified location 120 may correspond to various positions and/or operations associated with the print job 106. For example, the specified location 120 may correspond to a position of a particular feed roller in association with the print zone 126 of the printing device 150.

According to an example, prior to actuating at or beyond the specified location 120 along the path associated with traversal of the physical medium 122 from the start position 124 to the print zone 126, a print bar control module 130 may uncap the print bar 118, and move the print bar 118 to a print position. Further, the print bar heating power supply control module 110 and the print bar control power supply control module 112 may respectively actuate, after uncapping of the print bar 118 and movement of the print bar 118 to the print position, at or beyond the specified location 120 along the path associated with traversal of the physical medium 122 from the start position 124 to the print zone 126, the print bar heating power supply 114 and the print bar control power supply 116 to reduce the operational temperature 128 associated with the print bar 118.

The apparatus 100 may further include a print job analysis module 132 to determine whether the physical medium 122 is a last physical medium associated with the print job 106. In response to a determination that the physical medium 122 is the last physical medium associated with the print job 106, the print job analysis module 132 may determine whether printing associated with the last physical medium is completed. Further, in response to a determination that printing associated with the last physical medium is completed, the print bar heating power supply control module 110 and the print bar control power supply control module 112 may respectively de-actuate the print bar heating power supply 114 and the print bar control power supply 116 to reduce the operational temperature 128 associated with the print bar 118. That is, as discussed above, the print bar heating power supply 114 and the print bar control power supply 116 are de-actuated simultaneously after printing of a last physical medium, instead of at a later stage.

The apparatus 100 may further include a print bar operational temperature determination module 134 to determine a lowest (or low, reduced, etc.) operational temperature 128 of the print bar 118. In this regard, in response to a determination that printing associated with the last physical medium is completed, the print bar operational temperature determination module 134 may determine the lowest operational temperature 128 of the print bar 118. Further, a printing material ejection module 136 may actuate the print bar 118 to eject the printing material 138 at the lowest operational temperature 128 to reduce the operational temperature 128 associated with the print bar 118. For example, the printing material ejection module 136 may actuate the print bar 118 to eject the printing material 138 at 30° C. (compared to a higher operational temperature of 60° C.) to reduce the operational temperature 128 associated with the print bar 118. According to an example, the printing material ejection module 136 may actuate the print bar 118 to eject a specified number of drops per nozzle (e.g., 10 drops per nozzle) at the lowest operational temperature 128 to reduce the operational temperature 128 associated with the print bar 118. The ejection of the printing material 138 at the lowest operational temperature 128 also provides for release of micro air bubbles inside nozzle chambers of the print bar 118, and entry of fresh printing material 138 into nozzle chambers to reduce the operational temperature 128 associated with the print bar 118 (e.g., the operational temperature of a pen associated with the print bar 118). After ejection of the printing material 138 at the lowest operational temperature 128, the print bar heating power supply control module 110 and the print bar control power supply control module 112 may respectively de-actuate the print bar heating power supply 114 and the print bar control power supply 116 to reduce the operational temperature 128 associated with the print bar 118.

Based on the reduction in the operational temperature 128 associated with the print bar 118, residual micro air bubbles within the printing material 138 have less thermal energy to grow inside and block nozzles of the print bar 118 from firing. Further, based on the reduction in the operational temperature 128 associated with the print bar 118, excessive heat from an orifice plate associated with the print bar 118 may be removed to cool the print bar 118, which thus reduces the evaporation rate at nozzles. Further, based on the reduction in the operational temperature 128 associated with the print bar 118, residual printing material on orifice plates may remain wetter to facilitate servicing to reduce printing material sludge around a die edge and endcap associated with the print bar 118.

Figure 2:
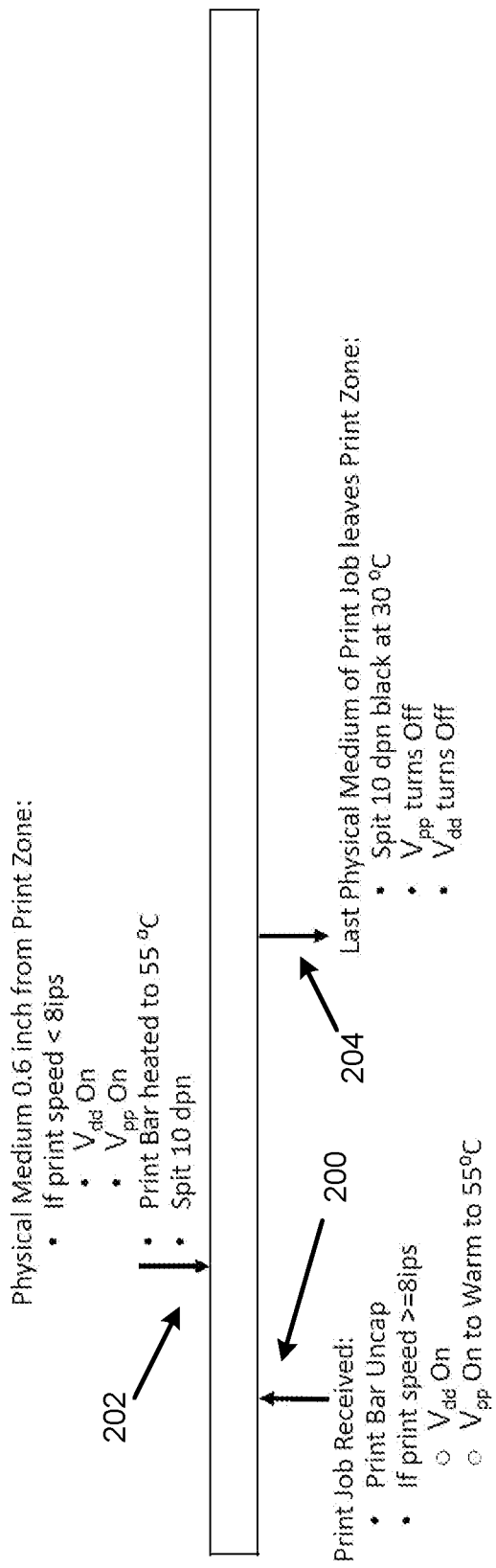
FIG. 2 illustrates a timeline for print bar control to illustrate operation of the printing device temperature management apparatus of FIG. 1, according to an example of the present disclosure.

FIG. 2 illustrates a timeline for print bar control to illustrate operation of the apparatus 100, according to an example of the present disclosure.

Referring to FIG. 2, according to an example, at location 200, a print job 106 may be received. At location 200, the print bar 118 may be uncapped. The print speed analysis module 102 may ascertain the print speed 104 associated with the print job 106. In response to a determination by the print speed analysis module 102 that the print speed 104 is greater than or equal to a specified print speed threshold 108 (e.g., 8 ips), the print bar heating power supply control module 110 and the print bar control power supply control module 112 may respectively actuate the print bar heating power supply 114 (e.g., $V_{pp}$) and the print bar control power supply 116 (e.g., $V_{dd}$) to respectively heat and control operation of the print bar 118.

At location 202, in response to a determination that the print speed 104 is less than the specified print speed threshold 108 (e.g., 8 ips), the print bar heating power supply control module 110 and the print bar control power supply control module 112 may respectively actuate, at or beyond the specified location 120 (e.g., 0.6 inches from the print zone 126) along a path associated with traversal of the physical medium 122 from the start position 124 to the print zone 126, the print bar heating power supply 114 and the print bar control power supply 116 to reduce the operational temperature 128 associated with the print bar 118.

At location 204, in response to a determination that the physical medium 122 is the last physical medium associated with the print job 106, the print job analysis module 132 may determine whether printing associated with the last physical medium is completed. Further, in response to a determination that printing associated with the last physical medium is completed, the print bar heating power supply control module 110 and the print bar control power supply control module 112 may respectively de-actuate the print bar heating power supply 114 and the print bar control power supply 116 to reduce the operational temperature 128 associated with the print bar 118. Yet further, at location 204, the printing material ejection module 136 may actuate the print bar 118 to eject the printing material 138 at the lowest operational temperature 128 to reduce the operational temperature 128 associated with the print bar 118. For example, the printing material ejection module 136 may actuate the print bar 118 to eject the printing material 138 at 30° C. (compared to a higher operational temperature of 60° C.) to reduce the operational temperature 128 associated with the print bar 118. Yet further, the printing material ejection module 136 may actuate the print bar 118 to eject a specified number of drops per nozzle (e.g., 10 drops per nozzle) at the lowest operational temperature 128 to reduce the operational temperature 128 associated with the print bar 118.

Figure 3:
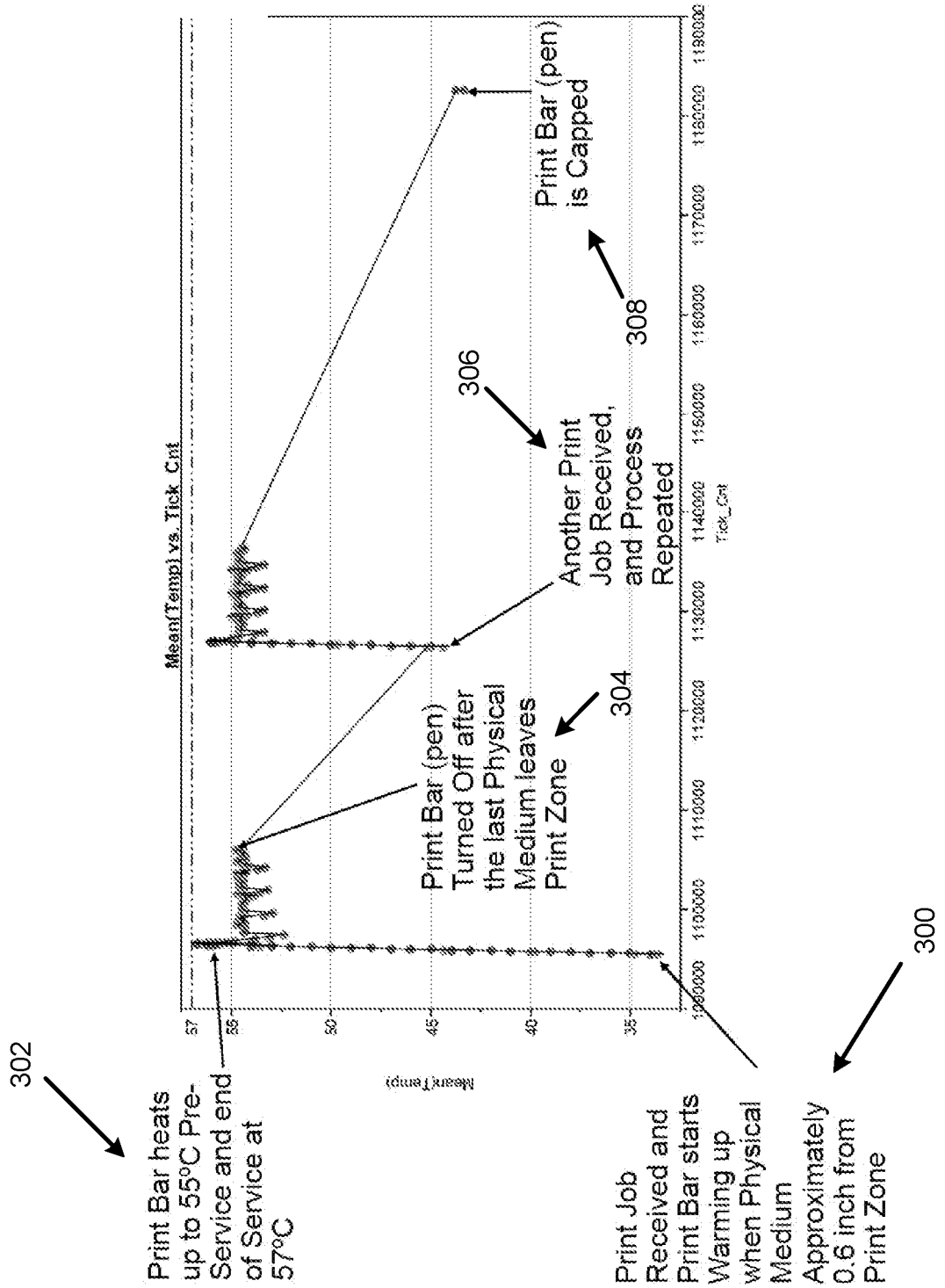
FIG. 3 illustrates a graph for print bar control to illustrate operation of the printing device temperature management apparatus of FIG. 1, according to an example of the present disclosure.

FIG. 3 illustrates a graph for print bar control to illustrate operation of the apparatus 100, according to an example of the present disclosure.

Referring to FIG. 3, at location 300, assuming that the print speed 104 is less than the specified print speed threshold 108 (e.g., 8 ips), the print bar heating power supply control module 110 and the print bar control power supply control module 112 may respectively actuate, at or beyond the specified location 120 (e.g., 0.6 inches from the print zone 126) along a path associated with traversal of the physical medium 122 from the start position 124 to the print zone 126, the print bar heating power supply 114 and the print bar control power supply 116 to reduce the operational temperature 128 associated with the print bar 118.

At location 302, the print bar 118 may heat to 55° C., with an end of service temperature being approximately 57° C.

At location 304, in response to a determination that the physical medium 122 is the last physical medium associated with the print job 106, the print job analysis module 132 may determine whether printing associated with the last physical medium is completed. Further, in response to a determination that printing associated with the last physical medium is completed, the print bar heating power supply control module 110 and the print bar control power supply control module 112 may respectively de-actuate the print bar heating power supply 114 and the print bar control power supply 116 to reduce the operational temperature 128 associated with the print bar 118.

At location 306, another print job 106 may be received, and the processes at 300 and 302 may be repeated.

At location 308, the print bar pen may be capped.

Figure 4:
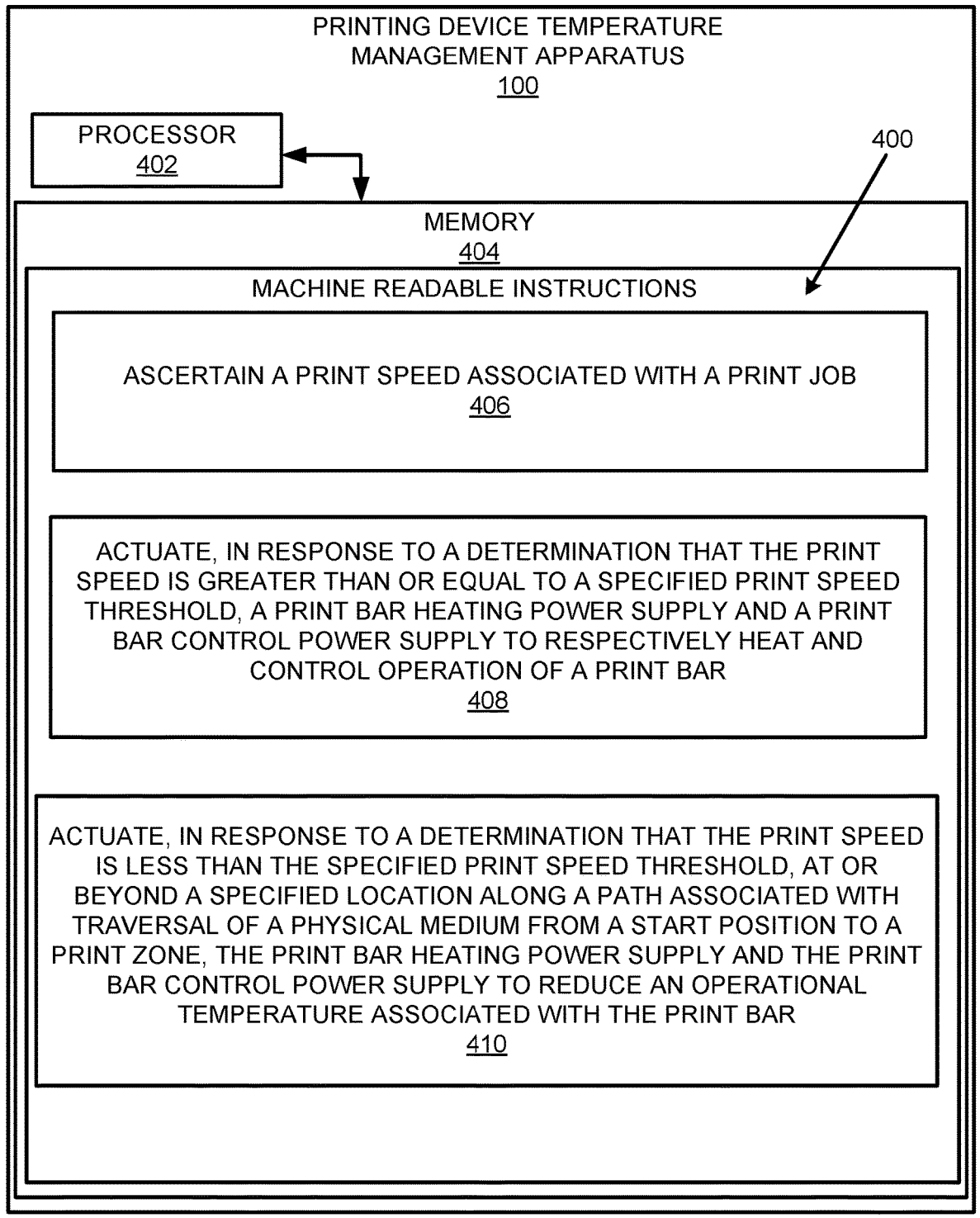
FIG. 4 illustrates a block diagram for printing device temperature management, according to an example of the present disclosure.
Figure 6:
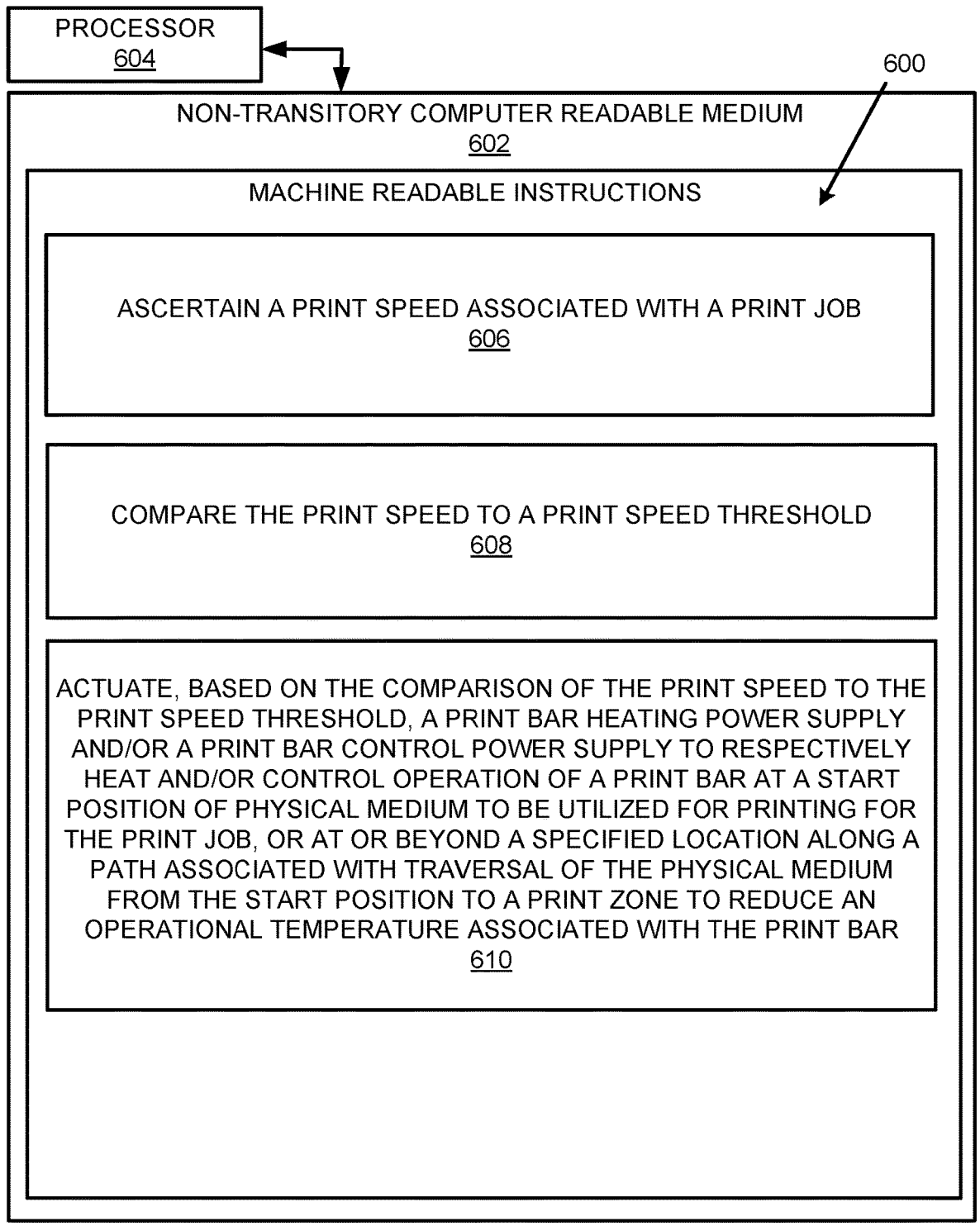
FIG. 6 illustrates a further block diagram for printing device temperature management, according to an example of the present disclosure.

FIGS. 4-6 respectively illustrate a block diagram 400, a flowchart of a method 500, and a further block diagram 600 for printing device temperature management, according to examples. The block diagram 400, the method 500, and the block diagram 600 may be implemented on the apparatus 100 described above with reference to FIG. 1 by way of example and not limitation. The block diagram 400, the method 500, and the block diagram 600 may be practiced in other apparatus. In addition to showing the block diagram 400, FIG. 4 shows hardware of the apparatus 100 that may execute the instructions of the block diagram 400. The hardware may include a processor 402, and a memory 404 storing machine readable instructions that when executed by the processor cause the processor to perform the instructions of the block diagram 400. The memory 404 may represent a non-transitory computer readable medium. FIG. 5 may represent a method for printing device temperature management, and the steps of the method. FIG. 6 may represent a non-transitory computer readable medium 602 having stored thereon machine readable instructions to provide printing device temperature management. The machine readable instructions, when executed, cause a processor 604 to perform the instructions of the block diagram 600 also shown in FIG. 6.

The processor 402 of FIG. 4 and/or the processor 604 of FIG. 6 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 602 of FIG. 6), such as hardware storage devices (e.g., RAM (random access memory), ROM (read only memory), EPROM (erasable, programmable ROM), EEPROM (electrically erasable, programmable ROM), hard drives, and flash memory). The memory 404 may include a RAM, where the machine readable instructions and data for a processor may reside during runtime.

Referring to FIGS. 1-4, and particularly to the block diagram 400 shown in FIG. 4, at block 406, the memory 404 may include instructions to ascertain (e.g., by the print speed analysis module 102) a print speed 104 associated with a print job 106.

At block 408, the memory 404 may include instructions to actuate (e.g., by the print bar heating power supply control module 110 and the print bar control power supply control module 112), in response to a determination that the print speed 104 is greater than or equal to a specified print speed threshold 108, a print bar heating power supply 114 and a print bar control power supply 116 to respectively heat and control operation of a print bar 118.

At block 410, the memory 404 may include instructions to actuate, in response to a determination that the print speed 104 is less than the specified print speed threshold 108, at or beyond a specified location 120 along a path associated with traversal of a physical medium 122 from a start position 124 to a print zone 126, the print bar heating power supply 114 and the print bar control power supply 116 to reduce an operational temperature 128 associated with the print bar 118.

Referring to FIGS. 1-3, and 5, and particularly FIG. 5, for the method 500, at block 502, the method may include ascertaining (e.g., by the print speed analysis module 102) a print speed 104 associated with a print job 106.

At block 504, the method may include actuating (e.g., by the print bar heating power supply control module 110 and the print bar control power supply control module 112), in response to a determination that the print speed 104 is greater than or equal to a specified print speed threshold 108, a print bar heating power supply 114 and a print bar control power supply 116 to respectively heat and control operation of a print bar 118.

At block 506, the method may include determining, in response to a determination that the print speed 104 is less than the specified print speed threshold 108, a distance of physical medium 122 from a print zone 126, and actuating, in response to a determination that the distance of the physical medium 122 from the print zone 126 is equal to a specified distance which is less than a total distance traversed by the physical medium 122 from a start position 124 to the print zone 126, at or beyond the specified distance, the print bar heating power supply 114 and the print bar control power supply 116 to reduce an operational temperature 128 associated with the print bar 118.

Referring to FIGS. 1-3, and 6, and particularly FIG. 6, for the block diagram 600, at block 606, the non-transitory computer readable medium 602 may include instructions to ascertain (e.g., by the print speed analysis module 102) a print speed 104 associated with a print job 106.

At block 608, the non-transitory computer readable medium 602 may include instructions to compare (e.g., by the print speed analysis module 102) the print speed 104 to a print speed threshold 108.

At block 610, the non-transitory computer readable medium 602 may include instructions to actuate (e.g., by the print bar heating power supply control module 110 and the print bar control power supply control module 112), based on the comparison of the print speed 104 to the print speed threshold 108, a print bar heating power supply 114 and/or a print bar control power supply 116 to respectively heat and/or control operation of a print bar 118 at a start position 124 of physical medium 122 to be utilized for printing for the print job 106, or at or beyond a specified location 120 along a path associated with traversal of the physical medium 122 from the start position 124 to a print zone 126 to reduce an operational temperature 128 associated with the print bar 118.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A printing device temperature management apparatus comprising:
   a processor; and
   a memory storing machine readable instructions that when executed by the processor cause the processor to:
      ascertain a print speed associated with a print job;
      in response to a determination that the print speed is greater than or equal to a specified print speed threshold, actuate a print bar heating power supply and a print bar control power supply to respectively heat and control operation of a print bar; and
      in response to a determination that the print speed is less than the specified print speed threshold, actuate, at or beyond a specified location along a path associated with traversal of a physical medium from a start position to a print zone, the print bar heating power supply and the print bar control power supply to reduce an operational temperature associated with the print bar.

2. The apparatus according to claim 1, wherein physical medium is to be utilized for printing for the print job.

3. The apparatus according to claim 1, wherein the specified location is located along the path at a specified distance from the print zone that is less than a total distance traversed by the physical medium from the start position to the print zone.

4. The apparatus according to claim 1, wherein the machine readable instructions, when executed by the processor, further cause the processor to:
   determine whether the physical medium is a last physical medium associated with the print job;

in response to a determination that the physical medium is the last physical medium associated with the print job, determine whether printing associated with the last physical medium is completed;

in response to a determination that printing associated with the last physical medium is completed, de-actuate the print bar heating power supply and the print bar control power supply to reduce the operational temperature associated with the print bar.

5. The apparatus according to claim 1, wherein the machine readable instructions, when executed by the processor, further cause the processor to:

determine whether the physical medium is a last physical medium associated with the print job;

in response to a determination that the physical medium is the last physical medium associated with the print job, determine whether printing associated with the last physical medium is completed; and in response to a determination that printing associated with the last physical medium is completed,
determine a lowest operational temperature associated with the print bar to eject printing material,
eject the printing material at the lowest operational temperature to reduce the operational temperature associated with the print bar, and
de-actuate the print bar heating power supply and the print bar control power supply to reduce the operational temperature associated with the print bar.

6. The apparatus according to claim 5, wherein the printing material includes black ink.

7. The apparatus according to claim 1, wherein the machine readable instructions to actuate, at or beyond the specified location along the path associated with traversal of the physical medium from the start position to the print zone, the print bar heating power supply and the print bar control power supply to reduce the operational temperature associated with the print bar further comprise machine readable instructions to cause the processor to:

uncap the print bar;
move the print bar to a print position; and
actuate, after uncapping of the print bar and movement of the print bar to the print position, at or beyond the specified location along the path associated with traversal of the physical medium from the start position to the print zone, the print bar heating power supply and the print bar control power supply to reduce the operational temperature associated with the print bar.

8. A method for printing device temperature management, the method comprising:

ascertaining, by a processor, a print speed associated with a print job;

actuating, in response to a determination that the print speed is greater than or equal to a specified print speed threshold, a print bar heating power supply and a print bar control power supply to respectively heat and control operation of a print bar; and determining, in response to a determination that the print speed is less than the specified print speed threshold, a distance of physical medium from a print zone, and
actuating, in response to a determination that the distance of the physical medium from the print zone is equal to a specified distance which is less than a total distance traversed by the physical medium from a start position to the print zone, at or beyond the specified distance, the print bar heating power supply and the print bar control power supply to reduce an operational temperature associated with the print bar.

9. The method according to claim 8, further comprising:
determining whether the physical medium is a last physical medium associated with the print job;
in response to a determination that the physical medium is the last physical medium associated with the print job, determining whether printing associated with the last physical medium is completed;
in response to a determination that printing associated with the last physical medium is completed, de-actuating the print bar heating power supply and the print bar control power supply to reduce the operational temperature associated with the print bar.

10. The method according to claim 8, further comprising:
determining whether the physical medium is a last physical medium associated with the print job;
in response to a determination that the physical medium is the last physical medium associated with the print job, determining whether printing associated with the last physical medium is completed; and
in response to a determination that printing associated with the last physical medium is completed,
determining a low operational temperature associated with the print bar to eject printing material,
ejecting the printing material at the low operational temperature to reduce the operational temperature associated with the print bar, and
de-actuating the print bar heating power supply and the print bar control power supply to reduce the operational temperature associated with the print bar.

11. The method according to claim 8, wherein actuating, in response to the determination that the distance of the physical medium from the print zone is equal to the specified distance, at or beyond the specified distance, the print bar heating power supply and the print bar control power supply to reduce the operational temperature associated with the print bar further comprises:
uncapping the print bar;
moving the print bar to a print position; and
actuating, after uncapping of the print bar and movement of the print bar to the print position, in response to the determination that the distance of the physical medium from the print zone is equal to the specified distance, at or beyond the specified distance, the print bar heating power supply and the print bar control power supply to reduce the operational temperature associated with the print bar.

12. A non-transitory computer readable medium having stored thereon machine readable instructions to provide printing device temperature management, the machine readable instructions, when executed, cause a processor to:
ascertain a print speed associated with a print job;
compare the print speed to a print speed threshold; and
actuate, based on the comparison of the print speed to the print speed threshold, at least one of a print bar heating power supply and a print bar control power supply to respectively heat and control operation of a print bar
at a start position of physical medium to be utilized for printing for the print job, or
at or beyond a specified location along a path associated with traversal of the physical medium from the start position to a print zone to reduce an operational temperature associated with the print bar.

13. The non-transitory computer readable medium according to claim 12, wherein the specified location is located along the path at a specified distance from the print zone that is less than a total distance traversed by the physical medium from the start position to the print zone.

14. The non-transitory computer readable medium according to claim 12, further comprising machine readable instructions, when executed, further cause the processor to:
    determine whether the physical medium is a last physical medium associated with the print job;
    in response to a determination that the physical medium is the last physical medium associated with the print job, determine whether printing associated with the last physical medium is completed;
    in response to a determination that printing associated with the last physical medium is completed, de-actuate at least one of the print bar heating power supply and the print bar control power supply to reduce the operational temperature associated with the print bar.

15. The non-transitory computer readable medium according to claim 12, further comprising machine readable instructions, when executed, further cause the processor to:
    determine whether the physical medium is a last physical medium associated with the print job;
    in response to a determination that the physical medium is the last physical medium associated with the print job, determine whether printing associated with the last physical medium is completed; and
    in response to a determination that printing associated with the last physical medium is completed,
        determine a reduced operational temperature associated with the print bar to eject printing material,
        eject the printing material at the reduced operational temperature to reduce the operational temperature associated with the print bar, and
        de-actuate at least one of the print bar heating power supply and the print bar control power supply to reduce the operational temperature associated with the print bar.

\* \* \* \* \*